३,३५६,६५५
COPOLYMERS OF ETHYLENICALLY UNSATURATED HYDROXY-FUNCTIONAL AMINES
Kazys Sekmakas, Chicago, Ill., assignor to De Soto, Inc., a corporation of Delaware
No Drawing. Filed Aug. 15, 1966, Ser. No. 572,180
9 Claims. (Cl. 260—78.5)

This invention relates to new ethylenically unsaturated hydroxy-functional amines and the production thereof as well as copolymers containing the same. The invention especially contemplates film forming aqueous emulsions of copolymerized ethylenically unsaturated materials, which emulsions deposit films which exhibit good adhesion to glossy or chalky surfaces and improved adhesion to surfaces previously coated with oil based paints, as well as improved water resistance. More particularly, the present invention contemplates copolymer emulsions of fine particle size in which the dispersed particles of the emulsion are constituted by particles of emulsion copolymers of monoethylenically unsaturated materials including a proportion of the new unsaturated hydroxy-functional amines noted hereinbefore in combination with other monoethylenically unsaturated materials providing oxirane functionality.

Aqueous emulsions or latex paints are presently in wide use since they are inexpensive, apply easily with water clean-up after application, and the coatings dry rapidly with minimum odor. Unfortunately, and as is known, latex paints are subject to important disadvantages which have limited their utility and detracted from their potential value. Thus, available latex paints do not adequately adhere to previously painted surfaces which are glossy or chalky. Also, the deposited films lack desirable water resistant properties and the films do not adequately adhere to surfaces previously painted with oil based paints. When alkyd resins are used in combination to improve adhesion, water resistance is further impaired.

In accordance with the present invention, these disadvantages are overcome by employing aqueous emulsion copolymers or interpolymers of polymerizable monoethylenically unsaturated materials which include a small proportion of certain ethylenically unsaturated hydroxy-functional amines. The presence of these hydroxy derivatives especially in combination with the presence of the oxirane group which may also be present in the interpolymer markedly alters the character of the aqueous emulsion copolymer to provide emulsion coating systems which exhibit good adhesion to glossy or chalky surfaces and improved adhesion to surfaces painted with oil based paints. Also, and despite water application, the deposited films resist water well even when alkyd resins are used to upgrade adhesion to chalked surfaces.

The term aqueous emulsion copolymer is used to denote copolymers or interpolymers produced by copolymerizing a liquid mixture of polymerizable monomers dispersed in aqueous medium in the form of finely divided particles of sufficient fineness (up to about 3 microns) to be stably dispersed in water. As is known, aqueous emulsion copolymers are of very high molecular weight and the emulsion copolymer feature of the invention is in no way related to copolymers of far lower molecular weight which may be produced by other polymerization technique, such as suspension polymerization which produces polymer particles which are not stably suspended, solution polymerization or polymerization in bulk. Indeed, such copolymers are useless in the emulsions contemplated by the invention, though solution copolymers provide another and different feature of the invention.

First, the invention is based on the finding that valuable new hydroxy-functional ethylenically unsaturated amines may be provided by reacting a monoethylenically unsaturated mono-oxide with a saturated carboxy-functional derivative of ethylene urea or the like which retains amine functionality. Reference is made to my prior copending applications Serial Nos. 506,273, filed November 3, 1965, and 528,359, filed February 18, 1966, in which an unsaturated dicarboxylic acid is used instead of a saturated polycarboxylic acid as required herein. While similar objectives are reached by the present invention, the capacity for copolymerization is obtained herein in a very different manner. With respect to the carboxy-functional derivative of ethylene urea, the invention will be illustrated particularly by the reaction of hydroxyethyl ethylene urea and succinic anhydride.

In the reaction of the hydroxy derivative of ethylene urea and the like with succinic anhydride or other saturated polycarboxylic acid anhydride, the anhydride group reacts with the hydroxy group of the ethylene urea derivative in order to provide a monomeric product which retains one of the carboxyl functionalities of the anhydride and the amine functionality of the ethylene urea derivative. The reaction of a dicarboxylic acid anhydride with an hydroxy derivative of ethylene urea is known in the art.

Further in accordance with the present development, it has been found tha the saturated derivatives noted above and which include both carboxyl functionality and amine functionality can be reacted with an ethylenically unsaturated mono-oxide to generate a monoethylenically unsaturated hydroxy ester without causing gelation and without consuming the desired amine functionality. In this way, the carboxyl functionality which is deleterious to the water resistance of the final product is consumed and desired hydroxy functionality is generated. Also, the monoethylenic unsaturation of the mono-oxide is capable of participating in addition polymerization and, on this basis, the hydroxy amines which are produced can be incorporated into copolymers or interpolymers by known methods of polymerization, the preferred products being made by emulsion copolymerization.

In comparison with the use of unsaturated dicarboxylic acid anhydrides as described in my prior application, the present development forms a product in which the ethylenically unsaturated site is in a terminal position, e.g., a vinyl unsaturation.

Also, and as noted in my application S.N. 528,359, the amino acid can be reacted with aromatic mono-oxides which preferentially react with the amino group. In this way, the amine functionality can be at least partially replaced with hydroxy functionality to the extent desired.

From the broad standpoint, the unsaturated mono-oxide used in the invention is reacted with an amino acid having the formula:

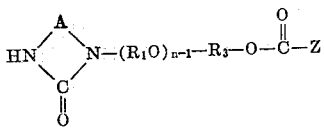

where:
$R_1$ is a $(C_2-C_3)$ alkylene group;
$R_3$ is a $(C_2-C_8)$ alkylene group;
A is a $(C_2-C_3)$ alkylene group;
$n$ is an integer having a value of 1 to 10; and
Z is the residue of a saturated polycarboxylic acid.

As will be evident from the formula presented hereinabove, any saturated polycarboxylic acid may be used for reaction with the hydroxy-functional ethylene urea derivative, it being preferred to employ dicarboxylic acids, especially aliphatic dibasic acids containing from 4–6 carbon atoms. From the standpoint of cost, availability and properties, succinic acid is preferred, but adipic acid is also useful with good effect. Of course, in order to smoothly operate the process without gelation, these acids should be used in the form of their anhydride. All of the polycarboxylic acids are useful to the extent that these are available in the form of the anhydride. Aromatic dicarboxylic acid anhydrides are illustrated by phthalic anhydride. While dibasic acids are preferred, it is possible to employ any polycarboxylic anhydride, such as trimellitic anhydride, but this is less preferred.

To illustrate the preferred compounds in accordance with the invention, the cyclic amine is ethylene urea, the hydroxy ethyl derivative is used, and the acid selected is aliphatic and dicarboxylic; providing compounds with the following formula:

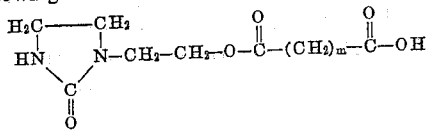

where:
$m$ is an integer from 1 to 10.

Any monoethylenically unsaturated organic mono-oxide may be used for reaction with the saturated amino acids noted hereinbefore, the aliphatic compounds being preferred since these are strongly selectively reactive with the carboxylic acid group in preference to the amino group carried by the cyclic ethylene urea structure. As indicated hereinbefore, this preferential reaction is important in enabling the carboxyl group to be consumed and the desired amino group to be retained together with the production of an essentially monomeric reaction product.

The preferred unsaturated mono-oxides are glycidyl esters and ethers such as glycidyl allyl ether and glycidyl acrylate or methacrylate.

As will be understood, when the preferred compounds noted above are reacted with the preferred unsaturated mono-oxides noted above, the hydrogen atom of the carboxyl group is replaced by V—OH where V is the residue of monoethylenically unsaturated glycidyl ester or ether which carries the hydroxy group generated by the reaction thereof with the carboxyl group of the amino acid.

Other useful unsaturated aliphatic mono-oxides are illustrated by vinylcyclohexene monoxide.

Using glycidyl acrylate to illustrate the development, the preferred products have the following formula:

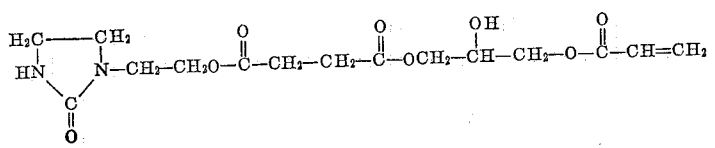

If epichlorohydrin had been used instead of propylene oxide for reaction with acrylic acid in the production of the unsaturated mono-oxide, then the chlorine atom of the epichlorohydrin would have been retained and would have been incorporated in the final product as illustrated by the following formula:

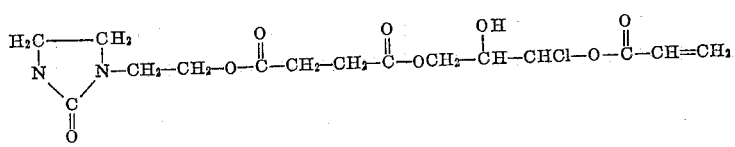

As will be understood from the foregoing, when unsaturated mono-oxide is reacted with an amino acid as previously described, there is produced compound having the formula:

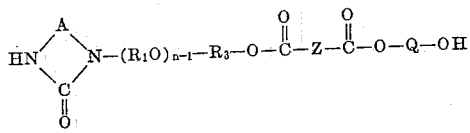

where $R_1$, $R_3$, A, $n$ and Z have the significance previously described and Q is the monoethylenically unsaturated residue of unsaturated mono-oxide which carries the hydroxy group generated by reaction with the carboxyl group of the amino acid.

The unsaturated mono-oxide reacts with the carboxyl group and not with the amino group of the ethylene urea derivative, in the presence or absence of an alkaline catalyst, so that the amine functionality is retained and the product is essentially monomeric. While alkaline catalysis of the reaction is not essential, since the amino group on the amino acid provides sufficient basicity to carry out the process in the absence of alkaline catalysis, the reaction is made more rapid by the presence of alkaline catalysts. While benzyl trimethyl ammonium chloride is a particularly preferred catalyst, any alkaline compound may be used, those having a nitrogen base being preferred. Amines, and especially tertiary amines are particularly preferred. Thus, inorganic alkaline compounds such as alkali metal hydroxides and alkaline earth metal hydroxides are broadly operable, but are not preferred because these introduce impurities into the resinous product. Ammonia is quite suitable as are quaternary ammonium compounds such as tetramethyl ammonium hydroxides. Amines such as ethyl amine and butyl amine may be used. However, tertiary amines illustrated by triethyl amine, tripropyl amine and tributyl amine are particularly preferred amines.

The reaction is essentially stoichiometric, it being convenient to employ a small molar excess of unsaturated monooxide, e.g., a 10% excess. The amine functionality is not significantly disturbed as evidenced by the decreased acid value which is observed as a result of the reaction.

Aromatic mono-oxide can be used to provide preferred properties and, in this connection, it is desirable to employ styrene oxide or vinyl toluene oxide to react with a small proportion of the amino hydrogen groups which are available in order to balance the hydrophylic and hydrophobic properties and increase the hydroxy functionality of the product while retaining the desired amine functionality. Preferably, from 2% up to about 20% of the available amino hydrogen atoms are reacted with aromatic monoxide.

While the present invention includes the new hydroxy amine derivatives which have been produced and the production thereof as well as polymers and copolymers of from 0.1–20% by weight of this polyfunctional product with the balance of the addition polymer being other ethylenically unsaturated material copolymerizable therewith, especially monomers containing the $CH_2=C<$ group such as methyl methacrylate, ethyl acrylate, butyl acrylate, styrene, vinyl toluene, acrylonitrile and the like, an important feature of the invention is certain emulsion copolymers or interpolymers with oxirane-containing monomers having important new properties.

Referring first to the broad area of copolymers which may be produced in accordance with the present invention, the unsaturated hydroxy amines which are produced in accordance with the invention are copolymerized with numerous other ethylenically unsaturated materials to form copolymers in which both the amine and the hydroxy functionality of the unsaturated hydroxy amine derivatives of the invention can be relied upon to provide thermosetting properties. This is especially true when the copolymer is a solution copolymer and includes other copolymerized materials providing reactive groups as are provided by hydroxy-containing ethylenic monomers or oxirane-containing ethylenic monomers. In these copolymers the unsaturated hydroxy-amine derivatives of the invention are desirably present in an amout of from 0.5% to 20% by weight, more preferably from 2–15% by weight. The hydroxy functional monomers are desirably present in an amount of from 2–30% by weight, preferably from 4–15% by weight. The oxirane-functional monomers are desirably present in an amount of from 0.5–20% by weight, preferably from 2–15% by weight.

The preferred hydroxy-functional monomers are illustrated by 2-hydroxy ethyl and 2-hydroxy propyl acrylate and methacrylate, though these are merely illustrative of the class which also includes other hydroxy alkyl methacrylates and acrylates such as 3-hydroxy propyl methacrylate, 4-hydroxy butyl methacrylate and the corresponding acrylates. Still further hydroxy-containing monomers which may be used are ethylene glycol allyl ether, propylene glycol allyl ether, butylene glycol allyl ether, diethylene glycol allyl ether, trimethylol propane allyl ether and 2-hydroxy-methyl-5-norbornene (either the endo isomer or the exo isomer or mixtures thereof). Still further, allyl alcohol, methallyl alcohol, crotyl alcohol and unsaturated fatty alcohols corresponding to drying oil fatty acids may be used.

The oxirane-containing monomers which may be used to provide thermosetting properties to the solution copolymers which are contemplated are the same as those which have been noted hereinbefore for reaction with the cyclic amino acid, e.g., glycidyl acrylate, allyl glycidyl ether, glycidyl vinyl ether, dipentene monoxide, etc.

With respect to the aqueous emulsion interpolymers, these are formulated to include from 0.1–5% by weight, based on the total weight of copolymerizable material, of the unsaturated hydroxy amine product referred to. While 5% is a preferred maximum, up to 15% of the hydroxy amine product may be tolerated, though this is wasteful.

The aqueous emulsion interpolymers are formulated to further include oxirane-containing monomers in small amounts and preferably in proportions of about 0.2–5% by weight, based on the total weight of copolymerizable material, though as little as 0.1% has some effect and about 15% may be tolerated. The oxirane material functions to provide, in combination with the amino alcohol, the superior water resistance, wet adherence and adherence to glossy and oil painted surfaces which are the objectives of the invention. It is particularly preferred that the oxirane material be ammoniated or aminated. More preferably, the oxirane-containing material is used in proportions of from 1–3% by weight.

The oxirane groups of the copolymer are preferably reacted with aminating and/or ammoniating agents to form the emulsion copolymers of the present invention. Apparently, the aminating and/or ammoniating agents react with the oxirane ring to cause the same to open, a hydrogen atom from the aminating or ammoniating agent combining with the oxygen atom to form an hydroxyl group, and the residue of the agent is directly attached to the remaining carbon atom of the oxirane ring.

The remainder of the emulsion copolymer consists essentially of at least one other monoethylenically unsaturated monomer, preferably one having no functional group other than the $CH_2=C<$ group. The numerous materials which may be used either alone or in mixtures are illustrated by methyl acrylate, ethyl acrylate, methyl methacrylate, butyl acrylate, styrene, 2-ethylhexyl acrylate, vinyl toluene, vinyl acetate, acrylonitrile, vinylidene chloride, etc. Small proportions, up to 5% by weight, of materials having a functional group other than the ethylenic group such as acrylic acid, acrylamide, methylol acrylamide, aminoacrylates or hydroxyethyl acrylate may also be present but, and with the exception of up to about 5% of unsaturated acid, monomers supplying other functional groups should be limited to amounts less than 3% by weight.

It is preferred that the monomers be selected to provide a copolymer having a glass transition temperature below room temperature so that the copolymer particles will coalesce by themselves without the necessity of applying external heat. However, the monomers can be selected to provide a copolymer having a higher glass transition temperature and higher boiling water miscible solvents may be used as taught in United States Patent 3,032,521. Water immiscible solvents, such as butyl Cellosolve acetate, can also be used.

While the present invention primarily contemplates aqueous emulsions which will provide flat-appearing coatings, a degree of surface gloss may be provided as taught in my copending application Serial No. 440,628, filed March 17, 1965.

It is desired to point out that emulsion polymerization is difficult to carry out with the water soluble monomers. The use of a small proportion of styrene oxide and the like, as indicated previously, decreases water solubility thereby minimizing homopolymerization, plating, and kickout problems. Water insoluble compounds emulsify much more readily and this results in a more uniform product and seeding, plating, and graininess problems are eliminated.

The details of the preferred emulsion copolymerization are set forth in my copending application.

The emulsion copolymers of the present invention preferably contain ammoniated oxirane groups, aminated oxirane groups or both. This ammoniation or amination reaction provides an emulsion coating composition which exhibits the improved properties discussed hereinbefore.

The amination or ammoniation reaction is preferably conducted after copolymerization, though less desirably the oxirane-containing material may be aminated or ammoniated prior to copolymerization.

The agents which may be used in the ammoniating or aminating reaction are preferably ammonium hydroxide or simple aliphatic primary and secondary monoamines such as 1 to 4 carbon atom alkyl and alkanol amines such as monoethanol amine. Both agents are preferably used in water solution. Ammonium hydroxide is particularly preferred because it is relatively inexpensive. Ammonia may also be used but this is less desirable. Other monoamines which may also be used are illustrated by tertiary butyl amine, ethyl amine, tertiary actyl amine, diethanolamine, dimethyl amine, methyl ethyl amine, etc. While mixtures of these agents may be used, it is preferred to use one for ease of production.

As would be evident, the ammoniating reaction with ammonium hydroxide is preferably conducted at room temperature so as not to cause extensive generation of ammonia.

The ammoniating and aminating agents are preferably used in sufficient proportion to cause ammoniation or amination of substantially all the oxirane groups carried by the oxirane-containing material.

The invention is illustrated in the examples which follow in which all parts are by weight.

*Example 1.—Preparation of ethylenically unsaturated hydroxy amine using allyl glycidyl ether*

| Grams | | |
|---|---|---|
| 729 (7 moles) | Amino ethyl ethanolamine. | Heat to 240–250° F. in 1½ hrs. using agitation and light nitrogen sparge. Hold for 1 hour. Then increase temperature to 390–400° F. in 2 hours. Hold for 1 hour. (Theoretical loss of NH₃, 238 gr. Actual loss, 243 gr.) Cool to 250° F. and add— |
| 420 (7 moles) | Urea | |
| 700 (7 moles) | Succinic anhydride | Add succinic anhydride and hold for 2 hours to provide an acid value of 190. |
| 390 | 2-ethoxy ethanol | Add. |
| 5 | Benzyl trimethyl ammonium chloride (60% solution in water). | Reheat to 250° F. |
| 878 | Allyl glycidyl ether (7 moles plus 10% excess). | Add allyl glycidyl ether over 2 hour period to reactor. Hold at 250° F. for acid value of 10–15. |

The final characteristics of the product are:
Actual Solids _____ percent__ 85.0
Theoretical solids _____ percent__ 86.2
Acid Value _____ percent__ 14.5
Viscosity (Gardner-Holdt) _____ U–V

*Example 2.—Preparation of ethylenically unsaturated hydroxy amine using glycidyl methacrylate*

| Grams | | |
|---|---|---|
| 729 (7 moles) | Amino ethyl ethanolamine. | Heat to 240–250° F. in 1½ hrs. using agitation and light nitrogen sparge. Hold for 1 hr. Then increase temperature to 390–400° F. in 2 hrs. Hold for 1 hr. (Theoretical loss of NH₃, 238 gr. Actual loss, 243 grams.) Cool to 250° F. |
| 420 (7 moles) | Urea | |
| 700 (7 moles) | Succinic anhydride | Add succinic anhydride and hold for 2 hours at 250° F. to provide an acid value of 190. |
| 390 | 2-ethoxy ethanol | Add and reheat to 220° F. |
| 5 | Benzyl trimethyl ammonium chloride (60% solution). | |
| 4.5 | Hydroquinone inhibitor. | |
| 1,093 | Glycidyl methacrylate (7 moles plus 10% excess). | Add glycidyl methacrylate over 2 hour period to reactor. Hold for acid value of 20–25. |

The final characteristics of the product are:
Actual solids, percent _____ 87.3
Theoretical solids, percent _____ 85.9
Acid value _____ 24
Viscosity (Gardner-Holdt) _____ $Z_2$–$Z_3$

*Example 2A*

The above example is repeated using 1270 grams of 2-ethoxy ethanol in place of the 390 grams used above and the benzyl trimethyl ammonium chloride catalyst is eliminated.

The final characteristics of this product are:
Actual solids, percent _____ 69
Acid value _____ 24.6
Viscosity (Gardner-Holdt) _____ J–K

*Example 3.—Preparation of emulsion polymer*

| Grams | | |
|---|---|---|
| | "A" | |
| 1,620 | Water | Charge into reactor equipped with an agitator, reflux condenser, thermometer, and nitrogen inlet tube. Heat to 170°F. |
| 3 | Sodium bicarbonate | |
| 9 | Potassium persulfate | |
| | "B" | |
| 1,600 | Water | Dissolve surfactants in 200 grams of water using fast speed agitation add product of Example 1. |
| 24 | Sodium lauryl sulfate | |
| 72 | Nonylphenoxy polyethylene-ethanol. | |
| 131 | Product of Example 1 | |
| | "C" | |
| 1,920 | Ethyl acrylate | Premix monomers and add to "B" using fast speed agitation. Add ingredients "B" plus "C" to reactor containing "A" over 2½ hrs. at 170–175° F. Hold for 1 hour at 175° F. Cool to 90° F. |
| 930 | Methyl methacrylate | |
| 15 | Glycidyl methacrylate | |
| 30 | Glacial methacrylic acid | |
| | "D" | |
| 75 | Ammonium hydroxide (28%). | Add "D" to emulsion to adjust pH to 9.0–10.0 using agitation. Strain through cheesecloth. |
| 80 | Water | |

The final characteristics of the product are:
Solids, percent _____ 47.0
Viscosity, c.p.s. _____ 28
pH _____ 9.8
Grain in the film _____ None
Plating in reactor _____ None

*Example 3A*

Example 3 is repeated using 131 grams of the product of Example 2A in place of the product of Example 1. Otherwise everything was the same.

The final characteristics of product are:
Solids, percent _____ 46.9
Viscosity, c.p.s. _____ 21
pH _____ 9.9

*Example 4.—Preparation of solution polymer*

| Grams | | |
|---|---|---|
| 500 | 2-ethoxy ethanol | Heat to 240° F. |
| | Monomer premix: | |
| 400 | Isobutyl acrylate | Premix monomers and catalyst and add over 2 hour period at 240–250° F. and hold for 1 hour. |
| 100 | Product of Example 1 | |
| 250 | Ethyl acrylate | |
| 50 | Styrene | |
| 200 | 2-hydroxy ethyl acrylate. | |
| 50 | Acrylic acid | |
| 35 | Benzoyl peroxide | Add and hold for 2 hours. |
| 4 | Benzoyl peroxide | Add and hold for 2 hours. |
| 4 | Benzoyl peroxide | Cool to 140° F. and add to dissolve resin. |
| 72 | Triethyl amine | |
| 570 | Water | |

The final characteristics of the product are:
Solids, percent _____ 45
Viscosity (Gardner-Holdt) _____ U–V
Color (Gardner) _____ 5–6

This water solution forms a thermosetting coating when applied on a metal substrate and baked 20 minutes at 350° F.

There is submitted in Table I hereinafter an indication of the properties of the emulsion interpolymers produced in accordance with the invention in comparison with other similar emulsions.

In the tests, wooden trim panels are painted with a standard zinc oxide pigmented linseed oil exterior house paint, and the painted panels are exposed to the weather for nine months, rendering them chalky and difficult to overcoat with emulsion paints. The panels are then wiped with a dry rag to remove surface dirt and the like and are then repainted with the emulsions under test.

The repainted panels are then submerged in water for 18 hours, and the wet panels are frozen in a freezer to below the freezing point of water and thawed to room temperature to provide a single test cycle. This test cycle is then repeated several times and adhesion is measured after each cycle by rubbing the coating vigorously with the finger to determine whether the paint comes off the panels.

In the table, the overall ratings of the coatings are numerically evaluated as follows:

Poor _____ 0–25
Fair _____ 25–50
Good _____ 50–75
Very good _____ 75–85
Excellent _____ over 85

TABLE I

|  | Wet Adhesion Properties | |
| --- | --- | --- |
|  | (1 cycle) | (5 cycles) |
| Emulsion polymer Example 3 | 85 | 85 |
| Emulsion polymer Example 3A | 85 | 85 |
| Standard Commercial product X | 30 | 10 |

In connection with the above evaluation of the present invention, comparison has been made with the best available competitive emulsion material known to me, and which is identified by the letter X. The chemical constitution of this competitive material is not specifically known to me.

The invention is defined in the claims which follow.

I claim:
1. A solution copolymer comprising from 0.5 to 20% by weight of the copolymer of the compound having the formula:

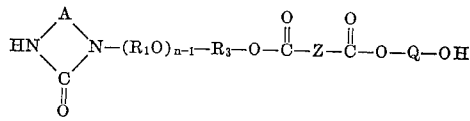

where:

$R_1$ is a ($C_2$—$C_3$) alkylene group;
$R_3$ is a ($C_2$—$C_8$) alkylene group;
A is a ($C_2$—$C_3$) alkylene group;
$n$ is an integer having a value of 1 to 10;
Z is the residue of a saturated polycarboxylic acid; and
Q is the monoethylenically unsaturated residue of unsaturated mono-oxide at least one copolymerizable monomer containing a single $CH_2=C<$ group and carrying a functional group selected from the group consisting of hydroxy functionality and oxirane functionality, and at least one further copolymerizable monomer containing a single $CH_2=C<$ group.

2. An aqueous emulsion copolymer consisting essentially of from 0.1 to 15% by weight of the copolymer of the compound having the formula:

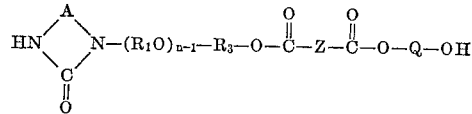

where:

$R_1$ is a ($C_2$—$C_3$) alkylene group;
$R_3$ is a ($C_2$—$C_8$) alkylene group;
A is a ($C_2$—$C_3$) alkylene group;
$n$ is an integer having a value of 1 to 10;
Z is the residue of a saturated polycarboxylic acid; and
Q is the monoethylenically unsaturated residue of unsaturated mono-oxide and at least one copolymerizable monomer containing a single $CH_2=C<$ group and copolymerizable with said compound in aqueous emulsion.

3. An aqueous emulsion copolymer consisting essentially of from 0.1 to 5% by weight of the copolymer of the compound having the formula:
where:

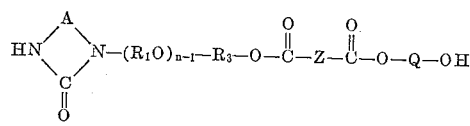

$R_1$ is a ($C_2$—$C_3$) alkylene group;
$R_3$ is a ($C_2$—$C_8$) alkylene group;
A is a ($C_2$—$C_3$) alkylene group;
$n$ is an integer having a value of 1 to 10;
Z is the residue of a saturated polycarboxylic acid; and
Q is the monoethylenically unsaturated residue of unsaturated mono-oxide from 0.1 to 5% by weight of the copolymer of at least one monoethylenically unsaturated compound supplying oxirane functionality to said copolymer and at least one copolymerizable monomer containing a single $CH_2=C<$ group and copolymerizable with said compound in aqueous emulsion.

4. An aqueous emulsion copolymer consisting essentially of from 0.1 to 5% by weight of the copolymer of the compound having the formula:

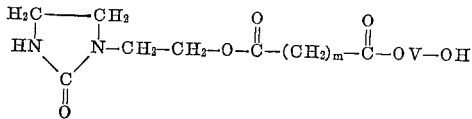

where:

$m$ is an integer from 1 to 10; and
V is the residue of monoethylenically unsaturated glycidyl ester or ether from 0.1 to 5% by weight of the copolymer of at least one monoethylenically unsaturated compound supplying oxirane functionality to said copolymer and at least one copolymerizable monomer containing a single $CH_2=C<$ group and copolymerizable with said compound in aqueous emulsion.

5. The copolymer of claim 3 in which said copolymer is reacted with ammonia or a volatile amine.

6. The copolymer of claim 4 in which said copolymer is reacted with ammonia or a volatile amine.

7. The copolymer of claim 2 in which said monoethylenically unsaturated mono-oxide is selected from the group consisting of glycidyl ethers and glycidyl esters of a monomer containing a single $CH_2=C<$ group.

8. The copolymer of claim 2 in which a portion of the amino hydrogen atoms in said compound is reacted with an aromatic mono-oxide.

9. The copolymer of claim 3 in which from 2–20% of the amino hydrogen atoms in said compound are reacted with an aromatic mono-oxide selected from the group consisting of styrene oxide and vinyl toluene oxide.

References Cited

UNITED STATES PATENTS 3,194,792   7/1965   Emmons _____ 260—78.5

SAMUEL H. BLECH, *Primary Examiner.*

W. J. BRIGGS, *Assistant Examiner.*